May 9, 1967 P. B. HELSDON 3,319,075

PULSE DELAY CIRCUITS USING RESONANT CHARGING WITH MINIMUM CURRENT DETECTORS

Filed May 28, 1962 2 Sheets-Sheet 1

INVENTOR
Peter Bennett Helsdon
BY Baldwin & Wight
ATTORNEYS

INVENTOR
Peter Bennett Helsdon
BY
Baldwin & Wight
ATTORNEYS

United States Patent Office 3,319,075 Patented May 9, 1967

3,319,075
PULSE DELAY CIRCUITS USING RESONANT CHARGING WITH MINIMUM CURRENT DETECTORS

Peter Bennett Helsdon, Chelmsford, England, assignor to Marconi's Wireless Telegraph Company Limited, London, England, a British company
Filed May 28, 1962, Ser. No. 198,005
Claims priority, application Great Britain, June 2, 1961, 19,985/61
4 Claims. (Cl. 307—88.5)

Figure 1:
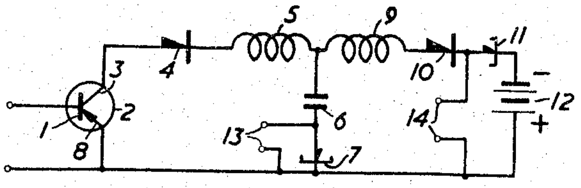

This invention relates to pulse and like delay circuit arrangements and has for its object to provide improved and simple circuit arrangements whereby a sequence of input pulses will give rise to a delayed sequence of output pulses with a desired, predetermined delay.

There are various known means for delaying pulses and the like, i.e. producing delayed output pulses from input pulses. Two types of circuit commonly employed for this purpose are those well known under the names "Phantastron" and "Multiar" and, of recent times, it has become fairly common to employ a highly stable keyed oscillator of comparatively high frequency and which is keyed by the input pulses and to count off a desired number of cycles of the oscillator by digital computer methods to obtain the required delay. These known arrangements have the defect of being complex and expensive, requiring the provision of a comparatively large number of valves or (more usually nowadays) transistors. The Phantastron and Multiar types of circuit usually exhibit considerable "jitter"—lack of constancy of the delay introduced—a typical jitter figure for a Multiar circuit being about one hundred to two hundred parts in a million. The oscillator-counter type of circuit is considerably better, from this point of view, having a typical jitter figure of about 10 parts in a million but, on the other hand, it is particularly expensive and complex.

Further practical requirements of a pulse delay circuit arrangement are that it should have as short a re-set time as possible, i.e. it should be ready to start a new timing cycle as soon as possible (preferably instantly) after giving out a delayed pulse and that the delay it introduces shall be, to as close a degree as possible, independent of applied operating potential. It is very difficult, if not impossible, to satisfy these requirements to the desired extent by the known pulse delay circuit arrangements above mentioned.

The present invention seeks to provide improved pulse delay circuit arrangements which shall be simple and inexpensive but nevertheless have a degree of freedom from jitter of the same order as that possessed by a good pulse delay circuit arrangement of the oscillator-counter type; which shall have zero re-set time; and which shall be to an acceptably close degree independent as regards the delay obtained, of variations in applied operating potential.

According to this invention a pulse or like delay circuit arrangement comprises: a condenser which is common to two circuit loops, the first including said condenser, a first inductor, a first rectifier and a pulse operable switch device all in series and the second including said condenser, a second inductor, a second rectifier and a potential source all in series, one rectifier being sensed to pass current in a direction to charge said condenser and the other being sensed to pass current in a direction to discharge said condenser; means for applying input pulses to said switch device; at least one approximately zero current detector in the second circuit loop; and means for taking off delayed output pulses set up across said current detector.

There may be only one approximately zero current detector, which may be either in the common part (which includes the condenser) of the two circuit loops or elsewhere in the second circuit loop, or there may be two such detectors, one in said common part and one elsewhere in the second circuit loop. Where there are two detectors, means may be provided for taking delayed output pulses from either or both of them.

Preferably the detector or detectors is or are so-called tunnel diodes. Diodes of this type approximate acceptably closely to zero current detectors.

Preferably the switch device is a transistor.

Figure 2:
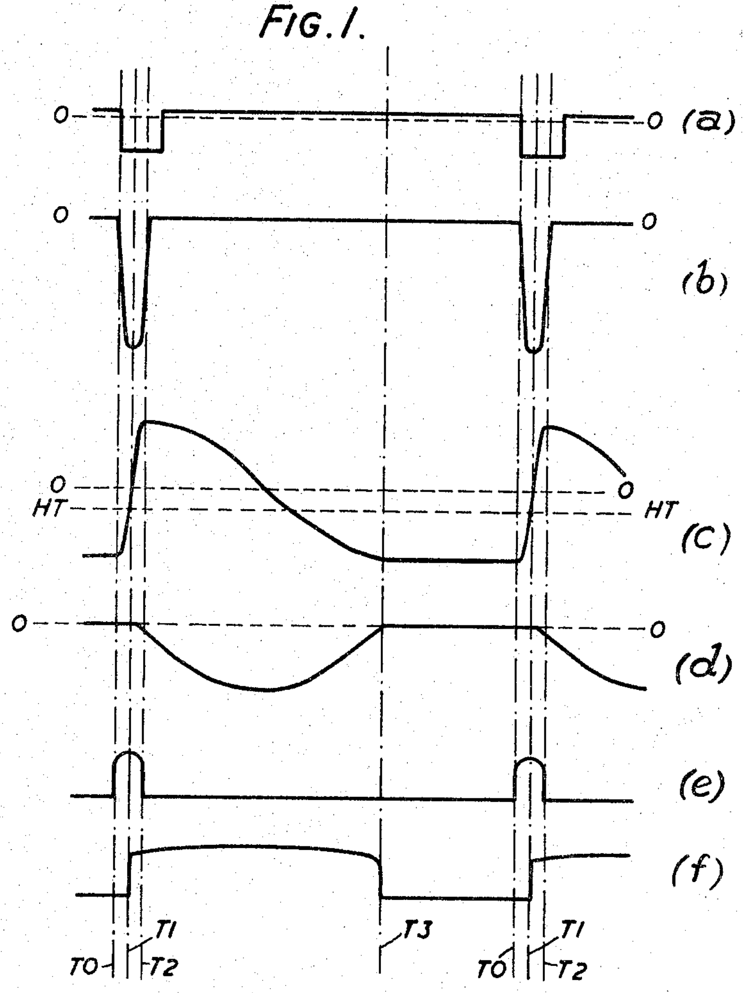
Figure 3:
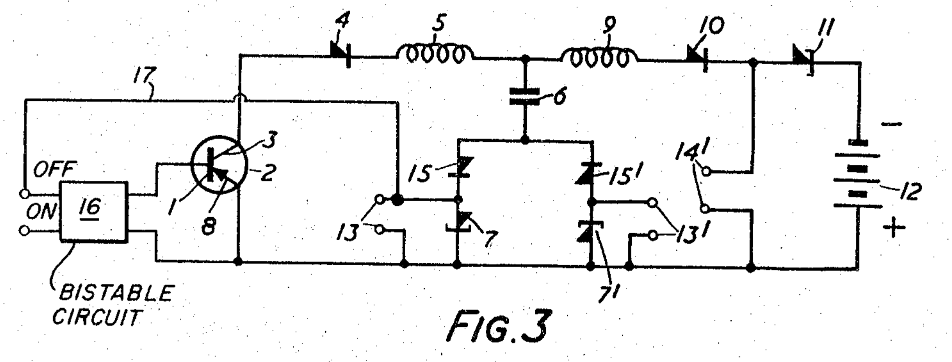
Figure 4:
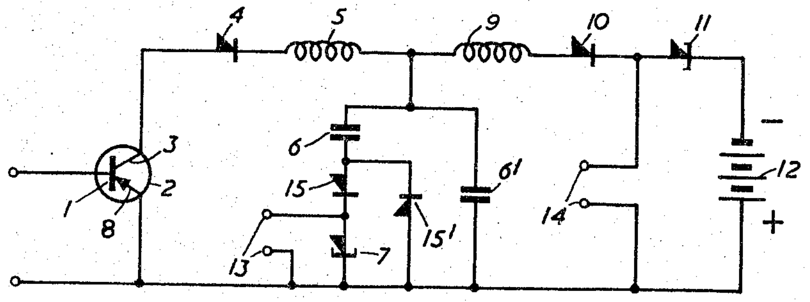
Figure 5:
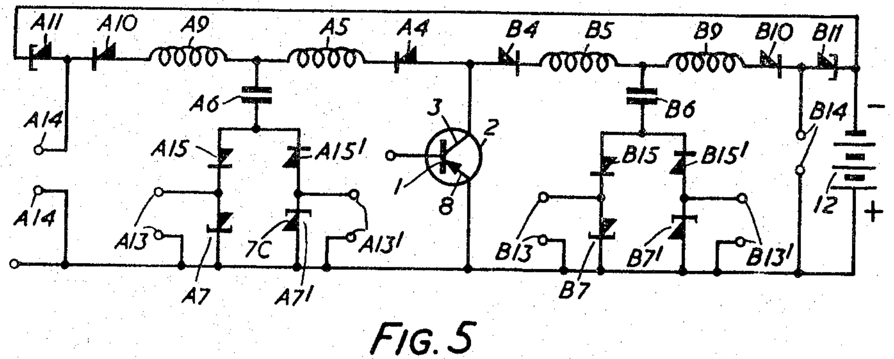

The invention is illustrated in and further explained in connection with the accompanying drawings. The figures of the drawings are numbered consecutively and like references are used therein for like parts. In the drawings, FIGURE 1 is a diagram of one embodiment; FIGURE 2 is an explanatory graphical figure showing, to the same time scale, voltage and current wave forms obtained in different parts of the arrangement of FIGURE 1 when in use; and FIGS. 3, 4 and 5 are diagrams of modifications of the arrangement of FIG. 1.

Referring to FIGURE 1, negative going input pulses to be delayed are applied to the base 1 of a transistor 2, the collector 3 of which is connected through a diode 4, sensed as shown to one end of an inductor 5, the other end of which is connected through a condenser 6 and a tunnel diode 7 to the emitter 8 of the transistor. The elements 6 and 7 are thus in a circuit loop which also includes the elements 5 and 4 and a pulse operable switch constituted by the transistor. The elements 6 and 7 are also in a second circuit loop which includes a second inductor 9, a second diode 10 sensed as shown, a second tunnel diode 11 and an operating D.C. potential source 12. It is not necessary to provide both tunnel diodes 7 and 11 and a single tunnel diode, anywhere in the second circuit loop, can be employed. Output terminals are connected across the tunnel diode or diodes, two pairs of output terminals 13 and 14 being shown in FIGURE 1.

The operation is as follows, assuming the arrangement to be in the steady state with the condenser 6 charged negatively and assuming a negative going pulse, as shown in line (a) of FIGURE 2, to be applied to the base 1 to "close" the switch constituted by the transistor. At this time $T_0$, the condenser 6 starts to discharge approximately sinusoidally through inductor 5 and, after approximately a quarter of a cycle, the condenser voltage is reduced substantially to zero and the current through inductor 5, represented in line (b) of FIGURE 2, reaches a maximum. It is important that the transistor remain "bottomed" during the passage of this comparatively heavy current. The voltage across the condenser is represented in line (c) of FIGURE 2, in which the broken line HT represents the voltage of the source 12.

During the next quarter cycle the current in inductor 5 decays, reversing the voltage on condenser 6 so that at the end of the full half cycle it has a charge substantially equal and opposite to the initial charge. This, however, cannot reverse the current flow through inductor 5 because of the diode 4. Instead a substantially sinusoidal current flow is built up in the inductor 9, which is larger than inductor 5, through the now forward-biased diode 10. After a quarter cycle of this period, which is longer than the previous period, the condenser charge is again reduced substantially to zero. Before this happens the transistor 2 must be again cut off because diode 4 is about to be forward biased. Line *d* of FIGURE 2 shows the current flow through inductor 9. Then follows a final quarter cycle of the longer period during which the condenser charge is brought back to its initial value, reversal of current through 9 being prevented by the action of the diode 10. The condenser 6 is then isolated with the correct charge in it and the circuit arrangement is ready for the next input pulse.

It will be seen that the arrangement utilises a sort resonance effect and that several repeated cycles of )eration are required to bring it to the steady working ıte with the correct charge in the condenser before an put pulse arrives. The input pulses need not, however, :cur at precisely equal intervals of time for proper )eration. Under steady state conditions the voltage /ing on the condenser may be many times the D.C. pply voltage from source 12. Immediately after an ıtput pulse is delivered the condenser is isolated by the en reversed biased transistor and diode 10 and is left ith a charge maintaining a negative voltage of, for :ample, five times the D.C. voltage from source 12. t this time both inductors carry zero current and the rangement is "poised" with all voltages and currents at .e correct level to start the next timing cycle which is itiated, at time $T_0$, by the next input pulse.

The tunnel diodes are good approximations to zero ırrent detectors. A typical available tunnel diode having peak current of 1 ma. will pass 10 ma. without risk : damage and will have a valley current of only about )0$\mu$a. This means that when a sinusoidal current of ) ma. peak value is allowed to pass through it, it will ve rise to a pulse step of about 04. volt amplitude ith a rise time of 10 nanosecond when the current ılls to 100 $\mu$a., i.e. 1% from zero. The tunnel :odes 7 and 11 are both operated on an N type ɜgative resistance characterstic curve. Incidentally one f the advantages of the approximately sinuosidal current ave form obtained in the described arrangement of ıe invention is that rate of change of current is a maxiıum as zero current is approached and about four times :eater than that of a comparable saw-tooth current aveform.

The nature of the delayed pulse output depends upon ıe position in the second circuit loop of the tunnel iode from which it is obtained. In the case of a tunnel iode 7 in the common part of the two circuit loops, a ulse step will be produced (at terminals 13) each time iode 4 ceases to conduct. This is shown in line *e* of IGURE 2. The short period $T_0$ to $T_2$ is determined ıainly by the values of the elements 5 and 6 and is ıbstantially half their natural period. In the case of tunnel diode 11 in the second circuit loop only, two seful pulse steps as shown in line *f* of FIGURE 2 will e given. The first, at time $T_1$, occurs when the current ı inductor 9 starts and the second, at time $T_3$, occurs /hen it falls to zero. The current in inductor 9 starts /hen the charge on the condenser reverses for the first me and the period $T_0$ to $T_1$ is substantially one quarter of ıe shorter natural period determined by the values of lements 5 and 6. The second pulse step, at time $T_3$, ccurs at a time determined (approximately) by the sum f the shorter half-period set by the values of the elements and 6 and the longer half-period set by the resonant requency of the elements 9 and 6. The approximation ; because, for the second quarter of the first half cycle, ıoth inductors are effectively in parallel. Thus three lelay periods are obtainable. The first, $T_0$ to $T_1$, is about ıalf the second, $T_0$ to $T_2$, both being determined mainly ıy the values of the elements 5 and 6, and the third $T_0$ to $T_3$ is longer than the other two and is determined ıainly by the values of the elements 9 and 6.

In an experimentally tested arrangement as illustrated, he perod $T_0$ to $T_3$ was 90 $\mu$sec. with a "jitter" of 1.8 ıanoseconds, equivalent to substantially 20 parts in a nillion. The period $T_0$ to $T_2$ was 5 $\mu$sec. with no measırable jitter. The rise time of the output pulses was ıbout 10 nanoseconds.

The good degree of freedom from jitter is due in part o the fact that the passive timing elements have low nherent noise. Johnson noise being kept at a minimum ɔy keeping resistive components to a minimum. In the llustrated circuit the passive timing components are the low loss, high Q inductors 5 and 9 and condenser 6.

Also the active elements used for switching and triggering are such as to generate a minimum of "shot" and "thermal" noise and are good as respects "flicker" noise. The main active elements are the low current tunnel diodes. The low current results in a minimum of shot noise and the low series resistance in a minimum of thermal noise. A tunnel diode is a majority carrier device so that it produces substantially no flicker noise. The one transistor 2 is used as a high level switch so that its flicker noise is negligible.

Pulse delay circuit arrangements in accordance with this invention are of wide application and may be used to advantage, inter alia, in television pulse and bar test waveform generators.

FIG. 3 shows a modification of FIG. 1, differing therefrom in that there are two branches in series with the condenser 6, each consisting of an ordinary diode 15 or 15′ in series with a tunnel diode 7 or 7′. The sense of connection of the elements 15 and 7 is the opposite to that of the elements 15′ and 7′. The added tunnel diode 7′ provides an output tuning waveform similar to that of tunnel diode 11 (as in FIG. 2*f*) but of opposite polarity and having a leading edge at time $T_2$ and terminating at $T_3$. Tunnel diode 7 acts as in FIG. 1. Because of the presence of the diodes 15 and 15′ reverse current cannot flow through the tunnel diodes. Output terminals 13′ are connected across the diode 7′.

FIG. 4 shows another modification of FIG. 1 wherein there is provided a second condenser 6′ to shunt unwanted current past the tunnel diode 7. Ordinary diodes 15 and 15″ are connected as shown to prevent parasitic oscillations from occurring. So fas as the basic operation of the circuit is concerned the condensers 6 and 6′ are effectively in parallel.

A number of tuning circuits as hereinbefore described can be driven by a single transistor. Such an arrangement is shown in FIG. 5 in which there are two tuning circuits, each as shown in FIG. 3, driven by the single transistor 2. Corresponding elements in the two tuning circuits are given the same references as in FIG. 3 except that, in one circuit, the references carry the affixed letter A and in the other they carry the affixed letter B. The battery 12 is, of course, common. There will be no adverse interaction between the tuning circuits provided that the transistor 2 is arranged to be "on" and "bottomed" for the longest period $T_0$ to $T_2$ (see FIG. 2) involved and is cut off before any of the diodes A4, B4 (or corresponding diodes if there be more than two tuning circuits) can conduct, i.e. before the voltage on any of the condensers A6, B6 (or corresponding other condensers, if any) can swing negative, as will occur about half-way through the shortest period $T_1$ to $T_3$ involved. This use of a single transistor to drive a number of tuning circuits should result in less jitter than if each circuit were separately driven by its own transistor.

In any of the illustrated embodiments the driving transistor 2 may be driven from any convenient form of bi-stable circuit or device arranged to be switched on (to switch on the transistor 2) by external means at time $T_0$ and switched off by means of a pulse derived by the tunnel diode 7 (if there is only one tuning circuit) or (if there is more than one tuning circuit driven by the transistor 2) by a pulse derived from the corresponding tunnel diode in the tuning circuit on which the time $T_2$ occurs latest. Such an arrangement is illustrated in FIG. 3 wherein the bistable circuit 16 has it output connected to transistor 2 and controls the state of the transisor switch device. An externally derived pulse is applied to the "ON" input terminal of bistable circuit 16 at time $T_0$, and the output pulse later produced at time $T_2$ by tunnel diode 7 is applied via lead 17 to the "OFF" input terminal of the bistable circuit. This expedient has the advatage of ensuring the correct duration of the driving pulse for the transistor.

It is not essential for the period $T_0$ to $T_2$ to be shorter than the period $T_1$ to $T_3$.

I claim:

1. A pulse delay circuit arrangement comprising a condenser which is common to two circuit loops, the first loop including said condenser, a first inductor, a first rectifier and a pulse operable switch device all in series, and the second loop including said condenser, a second inductor, a second rectifier and a potential source all in series, one of said rectifiers being sensed to pass current in a direction to charge said condenser and the other of said rectifiers being sensed to pass current in a direction to discharge said condenser; means for applying input pulses to said switch device; two approximately zero current detectors, one in the common part of the two circuit loops and the other elsewhere in the second circuit loop; and means for taking off delayed output pulses set up across at least one of said current detectors.

2. An arrangement as claimed in claim 1 and comprising means for taking delayed output pulses from both of the detectors.

3. An arrangement as claimed in claim 1 wherein the common part of the two circuit loops comprises the condenser in series with two parallel branches each including an approximately zero current detector and a rectifier in series, the sense of connection of the detector and rectifier in one branch being opposite to that of the corresponding elements in the other.

4. An arrangement as claimed in claim 1 wherein each zero current detector is a tunnel diode.

References Cited by the Examiner

UNITED STATES PATENTS

| | | | |
|---|---|---|---|
| 2,829,280 | 4/1958 | Goodall | 307—88.5 |
| 2,891,195 | 6/1959 | Smyth. | |
| 2,978,576 | 4/1961 | Watters | 307—88.5 |
| 2,995,679 | 8/1961 | Skoyles | 307—88.5 |
| 3,025,418 | 3/1962 | Brahm. | |
| 3,070,779 | 12/1962 | Logue | 307—88.5 |
| 3,134,048 | 5/1964 | Wolffram et al. | 28—67 |
| 3,142,765 | 7/1964 | Wine | 307—88.5 |

JOHN W. HUCKERT, *Primary Examiner.*

ARTHUR GAUSS, J. D. CRAIG, *Assistant Examiner.*